United States Patent
Morise et al.

(10) Patent No.: US 7,278,944 B2
(45) Date of Patent: Oct. 9, 2007

(54) HYDRAULIC CONTROL APPARATUS FOR AUTOMATIC TRANSMISSION

(75) Inventors: Masaru Morise, Nukata-gun (JP); Hideki Miyata, Okazaki (JP); Hiroshi Fukushima, Toyota (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 194 days.

(21) Appl. No.: 11/234,106

(22) Filed: Sep. 26, 2005

(65) Prior Publication Data

US 2006/0084545 A1    Apr. 20, 2006

(30) Foreign Application Priority Data

Oct. 14, 2004    (JP)    .............................. 2004-299643

(51) Int. Cl.
*F16H 31/00*    (2006.01)

(52) U.S. Cl. ..................................... 475/121

(58) Field of Classification Search ................ 475/121, 475/122, 123, 127, 128
See application file for complete search history.

(56) References Cited

U.S. PATENT DOCUMENTS 5,573,478 A * 11/1996 Tsukamoto et al. .......... 477/130
5,697,860 A * 12/1997 Shimei et al. .............. 475/128
6,846,259 B2 * 1/2005 Fujimine et al. ............ 475/121

FOREIGN PATENT DOCUMENTS

JP    5-322013    12/1993
JP    8-159275    6/1996

* cited by examiner

*Primary Examiner*—Dirk Wright
(74) *Attorney, Agent, or Firm*—Oblon, Spivak, McClelland, Maier & Neustadt, P.C.

(57) ABSTRACT

An oil hydraulic circuit includes a B2 apply control valve establishing communication between a second feedback oil channel connected to a feedback pressure chamber and a drain port, and between a D 1st speed oil channel and a drain port when SL pressure is supplied, and a B2 control valve cutting off an R-range pressure oil channel from a B2 oil channel, and establishing communication between the B2 oil channel and the D 1st speed oil channel when SLU pressure is supplied. An ECU turns on a solenoid (SL) to supply SL pressure to the B2 apply control valve, and turns on a linear solenoid (SLU) to supply SLU pressure to the B2 control valve, when the shift lever is set at the R position during forward running.

4 Claims, 6 Drawing Sheets

FIG. 3

|     | C1 | C2 | B1 | B2    | B3 | F    |
|-----|----|----|----|-------|----|------|
| 1ST | E  | DE | DE | E(E/B)| DE | E(D) |
| 2ND | E  | DE | E  | DE    | DE | DE   |
| 3RD | E  | DE | DE | DE    | E  | DE   |
| 4TH | E  | E  | DE | DE    | DE | DE   |
| 5TH | DE | E  | DE | DE    | E  | DE   |
| 6TH | DE | E  | E  | DE    | DE | DE   |
| R   | DE | DE | DE | E     | E  | DE   |

E(E/B)   ENGAGEMENT AT THE PERIOD OF ENGINE BRAKE
E(D)     ENGAGEMENT AT ONLY THE PERIOD OF DRIVING

HYDRAULIC CONTROL APPARATUS FOR AUTOMATIC TRANSMISSION

This nonprovisional application is based on Japanese Patent Application No. 2004-299643 filed with the Japan Patent Office on Oct. 14, 2004, the entire contents of which are hereby incorporated by reference.

BACKGROUND OF THE INVENTION

1. Field of the Invention

The present invention relates to a hydraulic control apparatus for an automatic transmission, particularly a hydraulic control apparatus for an automatic transmission having the gear implemented by engagement of a friction engagement element.

2. Description of the Background Art

Conventionally known is an automatic transmission provided with a low reverse brake that engages in response to supply of oil pressure when the first speed gear or reverse gear is to be implemented. In such an automatic transmission, there is known the technique of preventing the low reverse brake from engaging to implement a reverse gear when the shift lever is erroneously shifted to the reverse position during forward driving.

Japanese Patent Laying-Open No. 05-322013 discloses an oil pressure controller including a reverse inhibit valve that inhibits implementation of a reverse gear. This oil pressure controller includes a line pressure control valve, a solenoid valve receiving the line pressure as the supply pressure to operate in response to a switch control signal to output a control oil pressure, and a reverse inhibit valve that inhibits implementation of a reverse gear under switching control by the control oil pressure output from the solenoid valve. When determination is made that implementation of a reverse gear is to be inhibited, the line pressure is reduced prior to output of a switching control signal to the solenoid valve. The switching control signal is output to the solenoid valve under such a state to execute switching of the solenoid valve.

The oil pressure controller disclosed in the aforementioned publication has the solenoid valve switched in response to occurrence of a state to inhibit implementation of the reverse gear, whereby switching of the reverse inhibit valve is controlled. Accordingly, the R-range pressure supplied from the manual valve to the brake and clutch to implement the reverse gear is cut off by the reverse inhibit valve. As a result, implementation of the reverse gear is inhibited. Prior to switching of the solenoid valve, the line pressure is reduced. The solenoid valve is switched under the reduced pressure. Accordingly, the load during the switching operation of the solenoid valve becomes smaller. Thus, a lighter and economic solenoid valve having lower oil pressure for the switching operation is available.

With respect to a reverse inhibit valve that suppresses implementation of a reverse gear, there is known the technique of feeding the oil pressure output from the reverse inhibit valve back thereto.

Japanese Patent Laying-Open No. 08-159275 discloses a reverse inhibit valve having the oil pressure output therefrom feed back. This reverse inhibit valve includes a spool that can selectively establish a forward gear position and a reverse gear position, a forward pressure oil chamber provided at one end of the spool, a reverse pressure feedback oil chamber provided at the other end of the spool, a governor pressure oil chamber provided between a small diameter land and a large diameter land, a governor pressure input port through which governor pressure is input, a governor pressure output port from which governor pressure is output, a reverse pressure input port through which reverse pressure is input, a reverse pressure output port from which reverse pressure is output, and a spring in the reverse pressure feedback oil chamber. D-range pressure is supplied to the forward pressure oil chamber. Governor pressure is supplied to the governor pressure oil chamber. The reverse pressure output from the reverse pressure output port is fed back to the reverse pressure feedback oil chamber. The spring urges the spool in a direction against the D-range pressure of the forward pressure oil chamber and the governor pressure of the governor pressure oil chamber.

In accordance with the reverse inhibit valve disclosed in the aforementioned publication, the spool takes a reverse gear position by the urging force of the spring if the vehicle speed and the governor pressure are low when the reverse range (position) is selected through the select lever. At this stage, communication is established between the reverse pressure input port and the reverse pressure output port by the spool. Further, communication between the governor pressure input port and the governor pressure output port is cut. Accordingly, the R-range pressure is supplied to the hydraulic servo, whereby a reverse gear is implemented. When communication is once established between the reverse pressure input port and the reverse pressure output port, the reverse pressure output from the reverse pressure output port is fed back to the reverse pressure feedback oil chamber, whereby the spool is urged to the reverse gear position. Since the spool is held at the reverse gear position and communication between the governor pressure input port and governor pressure output port is cut off by the spool, the reverse gear can be maintained.

If a reverse inhibit valve that has the reverse pressure fed back, such as the reverse inhibit valve disclosed in Japanese Patent Laying-Open No. 08-159275, is applied to the oil pressure controller disclosed in Japanese Patent Laying-Open No. 05-322013, control of the reverse inhibit valve will be delayed, leading to the possibility of delay in the inhibition of the reverse gear. This problem will be described with reference to FIG. 6.

In the case where manual valve 5002 corresponds to a reverse position, R-range pressure from manual valve 5002 is supplied to a reverse inhibit valve 5004. At this stage, a solenoid 5006 is turned off when in the state to implement a reverse gear. Therefore, the spool of reverse inhibit valve 5004 takes the left-side state in FIG. 6 by the urging force of the spring provided in feedback oil chamber 5008. In this state, the R-range pressure supplied from manual valve 5002 is provided to the hydraulic servo of a brake 5010. Accordingly, brake 5010 engages, whereby a reverse gear is implemented. The oil pressure supplied to the hydraulic servo of brake 5010 is delivered back to feedback oil chamber 5008 as the feedback pressure.

In the case where implementation of the reverse gear is to be inhibited, solenoid 5006 is turned on, whereby the spool of reverse inhibit valve 5004 is switched to the right-side state in FIG. 6 by the oil pressure output from solenoid 5006. When the spool of reverse inhibit valve 5004 attains the right-side state in FIG. 6, the R-range pressure is cut off by reverse inhibit valve 5004 to prevent engagement of brake 5010. Accordingly, implementation of the reverse gear is inhibited.

If feedback pressure remains in feedback oil chamber 5008 during the switching of the spool of reverse inhibit valve 5004 to the right-side state in FIG. 6, the feedback pressure will oppose the oil pressure output from solenoid

5006. Therefore, control of. reverse inhibit valve 5004 will be delayed, leading to the possibility of delay in inhibition of the reverse gear.

SUMMARY OF THE INVENTION

In view of the foregoing, an object of the present invention is to provide a hydraulic control apparatus for an automatic transmission that can promptly suppress implementation of a gear.

According to an aspect of the present invention, a hydraulic control apparatus for an automatic transmission has a gear implemented by engagement of a friction engagement element. The hydraulic control apparatus includes a pressure regulation valve. The pressure regulation valve includes a first control pressure chamber to which first control pressure is introduced from a first control valve, and a feedback pressure chamber to which oil pressure that is to be supplied to the friction engagement element is branched off and introduced as feedback pressure. The pressure regulation valve is switched between an oil pressure supply state in which oil pressure generated at an oil pressure source is regulated to be supplied to the friction engagement element and an oil pressure cutoff state in which oil pressure is cut off, based on balance between the first control pressure and the feedback pressure. The hydraulic control apparatus also includes a switching valve. The switching valve includes a second control pressure chamber to which second control pressure is introduced from a second control valve, and a feedback pressure introduction port through which feedback pressure is introduced. The switching valve is switched by the second control pressure between either a feedback pressure supply state in which the oil pressure introduced through the feedback pressure introduction port is supplied to the feedback pressure chamber or a feedback pressure drain state in which the oil pressure is drained away from the feedback pressure chamber. The hydraulic control apparatus also includes a control unit controlling the first control valve and the second control valve such that the pressure regulation valve attains the oil pressure cutoff state and the switching valve attains the feedback pressure drain state when a predetermined condition is met.

According to the present invention, the pressure regulation valve is switched between an oil pressure supply state in which oil pressure is regulated to be supplied to a friction engagement element and an oil pressure cutoff state in which oil pressure is cut off based on balance between the first control pressure from the first control valve and the feedback pressure that is a branch-off of the oil pressure to be supplied to the friction engagement element. The feedback pressure is supplied to the feedback pressure chamber via the switching valve. The switching valve is switched to either a feedback pressure supply state in which oil pressure is supplied to the feedback oil chamber and a feedback pressure drain state in which oil pressure is drained away from the feedback pressure chamber according to the second control pressure from the second control valve. For example, in the case where the condition that the reverse position is selected during forward running is met, the second control valve is controlled by the control unit such that the switching valve is switched to the feedback pressure drain state. As a result, feedback pressure is drained away from the feedback pressure chamber of the pressure regulation valve via the switching valve. Therefore, the first control valve is controlled by the control unit such that the pressure regulation valve can be promptly switched when the pressure regulation valve is switched to the oil pressure cutoff state. Thus, a hydraulic control apparatus for an automatic transmission that can promptly suppress implementation of a gear can be provided.

Preferably, the automatic transmission is loaded into a vehicle. The pressure regulation valve is supplied with the oil pressure generated at the oil pressure source in response to the selection of either a forward position or a reverse position through manual operation by the driver. The predetermined condition includes the condition that the reverse position is selected when the forward running speed of the vehicle is equal to or above a predetermined speed.

In accordance with the present invention, the oil pressure generated at the oil pressure source is supplied to the pressure regulation valve in response to selection of either a forward position or a reverse position through manual operation by the driver. In the case where the condition that the reverse position is selected when the forward running speed of the vehicle is at least a predetermined speed is met, the pressure regulation valve is set at an oil pressure cutoff state, and the switching valve is set at a feedback pressure output state. Accordingly, supply of oil pressure to the friction engagement element is suppressed when a reverse position is erroneously selected during forward running. Therefore, implementation of a reverse gear can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an operation table representing the correspondence between each gear and respective brakes and clutches.

DESCRIPTION OF THE PREFERRED EMBODIMENTS

Figure 1:
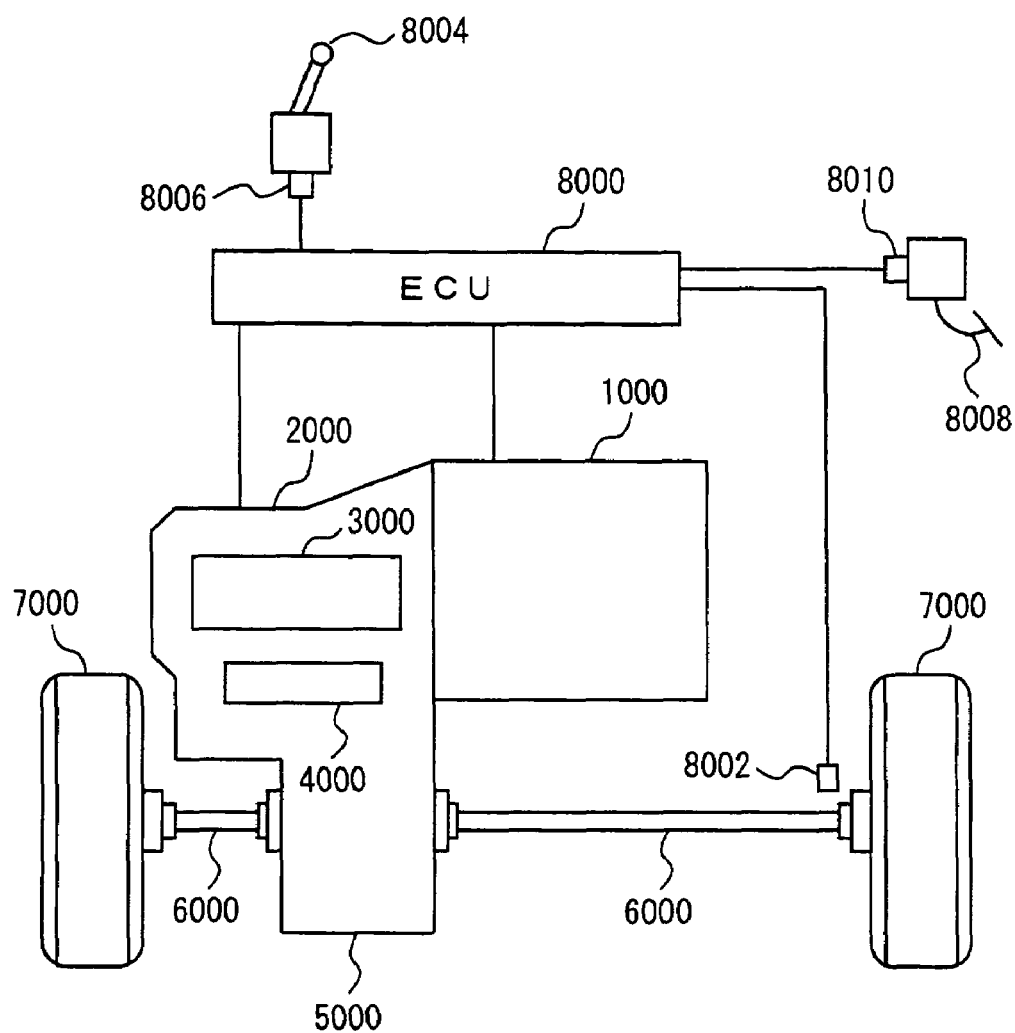
FIG. 1 is a control block diagram of a vehicle to which is loaded a hydraulic control apparatus for an automatic transmission according to an embodiment of the present invention.

An embodiment of the present invention will be described hereinafter with reference to the drawings. In the description set forth below, the same elements have the same reference characters allotted. Their designation and function are also identical. Therefore, detailed description thereof will not be repeated.

A vehicle mounted with a hydraulic control apparatus of an automatic transmission according to an embodiment of the present invention will be described with reference to FIG. 1. The vehicle is an FF (Front engine Front drive) vehicle. It is to be understood that the vehicle mounted with a hydraulic control apparatus for an automatic transmission of the present invention may be a vehicle other than an FF vehicle.

The vehicle includes an engine 1000, a transmission 2000, a planetary gear unit 3000 constituting a portion of a transmission 2000, an oil hydraulic circuit 4000 constituting a portion of transmission 2000, a differential gear 5000, a drive shaft 6000, a front wheel 7000, and an ECU (Electronic Control Unit) 8000.

Engine 1000 is an internal combustion engine that burns mixture consisting of fuel injected from an injector (not shown) and air, inside a combustion chamber of a cylinder. A piston in the cylinder is pushed down by the combustion, whereby a crank shaft is rotated. An external combustion engine may be employed instead of an internal combustion engine. Further, engine 1000 may be substituted with a dynamo-electric machine.

Transmission 2000 includes planetary gear unit 3000 and oil hydraulic circuit 4000. Transmission 2000 converts the revolution speed of the crank shaft to a desired revolution speed by implementing a desired gear. The output gear of transmission 2000 meshes with differential gear 5000. Planetary gear unit 3000 and oil hydraulic circuit 4000 will be described in detail afterwards.

Differential gear 5000 is linked with a drive shaft 6000 through spline meshing. Motive power is transmitted to the left and right front wheel 7000 via drive shaft 6000.

A vehicle speed sensor 8002, a position switch 8006 of shift lever 8004, and an accelerator pedal position sensor 8010 of an accelerator pedal 8008 are connected to ECU 8000 via a harness and the like to ECU 8000.

Vehicle speed sensor 8002 detects the speed of the vehicle from the revolution speed of drive shaft 6000, and transmits a signal representing the detected result to ECU 8000. The position of shift lever 8004 is detected by position switch 8006, and a signal representing the detected result is transmitted to ECU 8000. The gear of transmission 2000 is automatically implemented corresponding to the position of shift lever 8004. Further, a manual shift mode in which the driver can select a gear arbitrarily through an operation by the driver may be implemented. Accelerator pedal position sensor 8010 detects the position of accelerator pedal 8008, and transmits a signal representing the detected result to ECU 8000.

ECU 8000 controls equipment such that the vehicle attains a desired running state based on signals from vehicle speed sensor 8002, position switch 8006, accelerator pedal position sensor 8010 and the like, as well as a map and program stored in a ROM (Read Only Memory).

Figure 2:
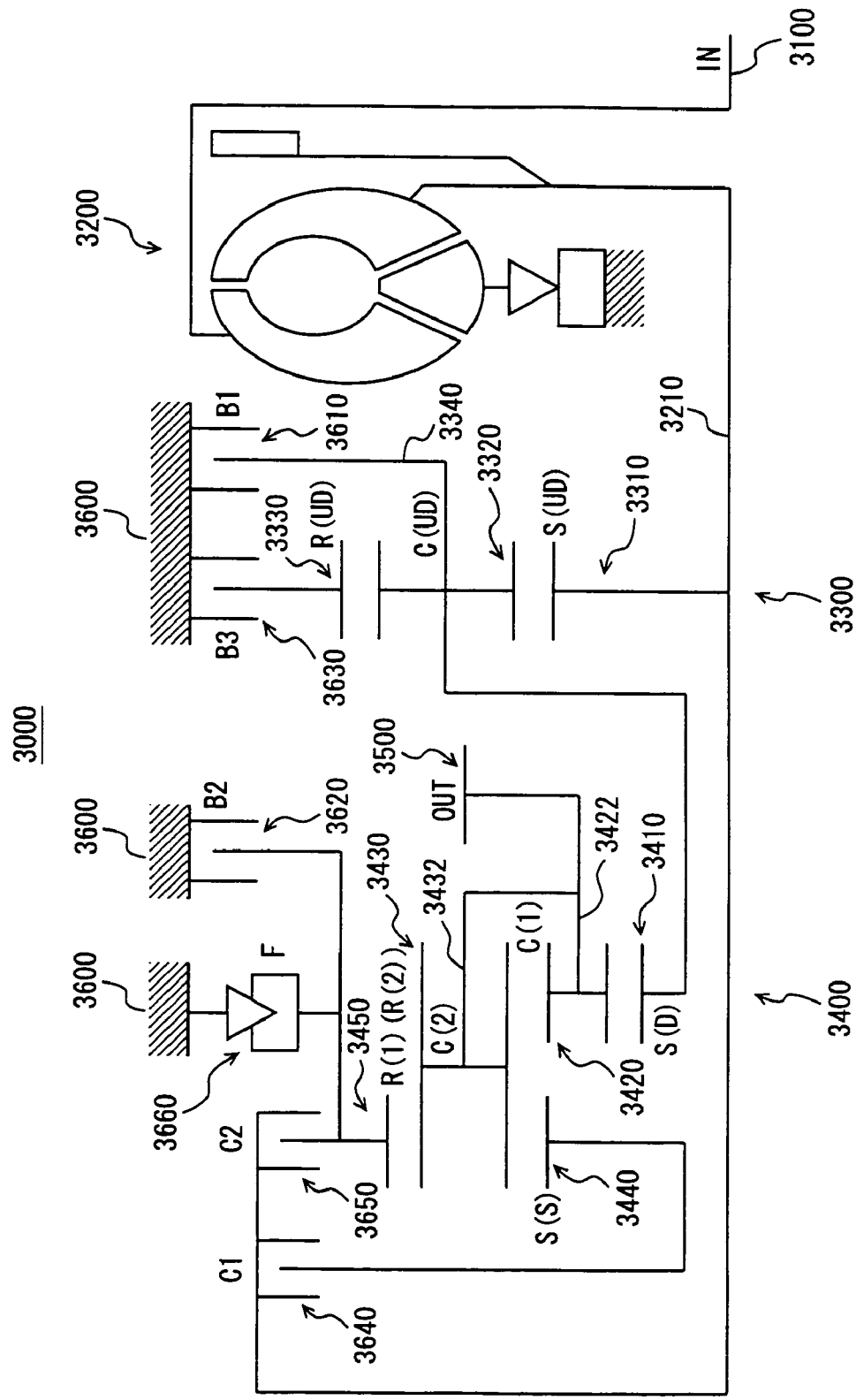
FIG. 2 is a skeleton diagram of a planetary gear unit.

Planetary gear unit 3000 will be described with reference to FIG. 2. Planetary gear unit 3000 is connected to a torque converter 3200 that has an input shaft 3100 linked to the crank shaft. Planetary gear unit 3000 includes a first set 3300 of a planetary gear mechanism, a second set 3400 of the planetary gear mechanism, an output gear 3500, brakes affixed to a gear case 3600, i. e. a B1 brake 3610, a B2 brake 3620 and a B3 brake 3630, a C1 clutch 3640, a C2 clutch 3650, and a one-way clutch F 3660.

First set 3300 is a single pinion type planetary gear mechanism. First set 3300 includes a sun gear S (UD) 3310, a pinion gear 3320, a ring gear R(UD) 3330, and a carrier C (UD) 3340.

Sun gear S (UD) 3310 is fixed to an output shaft 3210 of torque converter 3200. Pinion gear 3320 is rotatably supported on carrier C (UD) 3340. Pinion gear 3320 engages with sun gear (UD) 3310 and ring gear R (UD) 3300.

Ring gear R (UD) 3330 is fixed to gear case 3600 via B3 brake 3630. Carrier C (UD) 3340 is fixed to gear case 3600 via B1 brake 3610.

Second set 3400 is a Ravigneaux type planetary gear mechanism. Second set 3400 includes a sun gear S (D) 3410, a short pinion gar 3420, a carrier C (1) 3422, a long pinion gear 3430, a carrier C (2) 3432, a sun gear S (S) 3440, and a ring gear R (1) (R (2)) 3450.

Sun gear S (D) 3410 is linked to carrier C (UD) 3340. Short pinion gear 3420 is rotatably supported on carrier C (1) 3422. Short pinion gear 3420 engages with sun gear S (D) 3410 and long pinion gear 3430. Carrier C (1) 3422 is linked to an output gear 3500.

Long pinion gear 3430 is rotatably supported on carrier C (2) 3432. Long pinion gear 3430 engages with short pinion gear 3420, sun gear S (S) 3440, and ring gear R (1) (R (2)) 3450. Carrier C (2) 3432 is linked to output gear 3500.

Sun gear S (S) 3440 is linked to output shaft 3210 of torque converter 3200 by C1 clutch 3640. Ring gear R (1) (R (2)) 3450 is affixed to gear case 3600 by B2 brake 3620, and linked to output shaft 3210 of torque converter 3200 by C2 clutch 3650. Ring gear R (1) (R (2)) 3450 is linked to one-way clutch F 3660, and is disallowed of rotation during the drive of the first speed gear.

FIG. 3 is an operation table representing the correspondence of the operating state between each speed of transmission and respective brakes and clutches. "E" represents engagement. "DE" represents disengagement. "E (E/B)" represents engagement corresponding to only the period of engine braking. "E (D)" represents engagement corresponding to only the period of driving. By operating respective brakes and clutches according to the combination shown in the operation table, a forward gear of first to sixth speed and a reverse gear are implemented.

Since one-way clutch F 3660 is arranged in parallel with B2 brake 3620, engagement of B2 brake 3620 is not required at the driving state (acceleration) from the engine side at the time of implementing first speed gear (1ST), as indicated by "E (E/B)" in the operation table. In the present embodiment, one-way clutch F 3660 inhibits rotation of ring gear R (1) (R (2)) 3450 during the drive of first speed gear. In the case where the engine brake is to be applied, one-way clutch F 3660 does not inhibit rotation of ring gear R (1) (R (2)) 3450.

Oil hydraulic circuit 4000 will be described with reference to FIG. 4 that represents only the portion associated with the present invention. Oil hydraulic circuit 4000 includes an oil pump 4004, a manual valve 4100, a solenoid modulator valve 4200, a primary regulator valve 4202, a linear solenoid (SLT) 4204, a solenoid (SL) 4300, a linear solenoid (SLU) 4400, a B2 apply control valve 4500, and a B2 control valve 4600.

Oil pump 4004 is linked to the crank shaft of engine 1000 to be driven by the rotation of the crank shaft to generate oil pressure. The oil pressure generated at oil pump 4004 is regulated by primary regulator valve 4202 that operates with the throttle pressure output from linear solenoid (SLT) 4204 as pilot pressure. Accordingly, line pressure is produced. The line pressure is supplied to manual valve 4100 and solenoid modulator valve 4200.

Manual valve 4100 is linked to shift lever 8004. The position of the spool of manual valve 4100 is modified in response to the operation of shift lever 8004 by the driver.

When the spool is at a drive position (D), the oil pressure is supplied to B2 apply control valve 4500 via a first D-range pressure oil channel 4102. The oil pressure supplied via first D-range pressure oil channel 4102 is referred to as D-range pressure.

When the spool is at the reverse position (R), the oil pressure generated at oil pump 4004 is supplied to R-range pressure oil channel 4104. The oil pressure supplied via R-range pressure oil channel 4104 is referred to as R-range pressure.

Solenoid modulator valve 4200 adjusts the line pressure to a constant level. The oil pressure adjusted by solenoid modulator valve 4200 (solenoid modulator pressure) is supplied to linear solenoid (SLT) 4204, solenoid ($L) 4300, and linear solenoid (SLU) 4400.

Solenoid (SL) 4300 adjusts the solenoid modulator pressure. The oil pressure adjusted at solenoid (SL) 4300 (SL pressure) is supplied to an SL pressure chamber 4502 of B2 apply control valve 4500 via an SL pressure oil channel 4302.

Linear solenoid (SLU) 4400 adjusts the solenoid modulator pressure. The oil pressure (SLU pressure) adjusted at linear solenoid (SLU) 4400 is supplied to SLU pressure chamber 4602 of B2 control valve 4600 via SLU pressure oil channel 4402.

Solenoid (SL) 4300 and linear solenoid (SLU) 4400 is under control of ECU 8000. Solenoid (SL) 4300 and linear solenoid (SLU) 4400 may be duty solenoids.

B2 apply control valve 4500 receives, in addition to the D-range pressure and SL pressure, the oil pressure supplied to B1 brake 3610 (B1 pressure), the oil pressure supplied to B3 brake 3630 (B3 pressure), and the oil pressure supplied to C2 clutch 3650 (C2 pressure).

B2 control valve 4600 is connected to a hydraulic servo of B2 brake 3620 via B2 oil channel 3622. B2 apply control valve 4500 and B2 control valve 4600 are connected by a D 1st speed oil channel 4700 and a second D-range pressure oil channel 4702. B2 control valve 4600 receives SLU pressure, as well as D-range pressure supplied via either D 1st speed oil channel 4700 or second D-range pressure oil channel 4702.

A first feedback oil channel 4800 branched off from B2 oil channel 3622 is connected to a feedback pressure introduction port 4503 of B2 apply control valve 4500. Accordingly, the oil pressure supplied to the hydraulic servo of B2 brake 3620 is provided to B2 apply control valve 4500. Further, B2 apply control valve 4500 and B2 control valve 4600 are connected by second feedback oil channel 4802.

The operation of oil hydraulic circuit 4000 will be described hereinafter. When D-range is supplied from D 1st speed oil channel 4700, the oil pressure supplied to the hydraulic servo of B2 brake 3620 is fed back to B2 control valve 4600 (feedback pressure). The feedback pressure is supplied to feedback pressure chamber 4604 via feedback oil channel 4800 and second feedback oil channel 4802.

Figure 4:
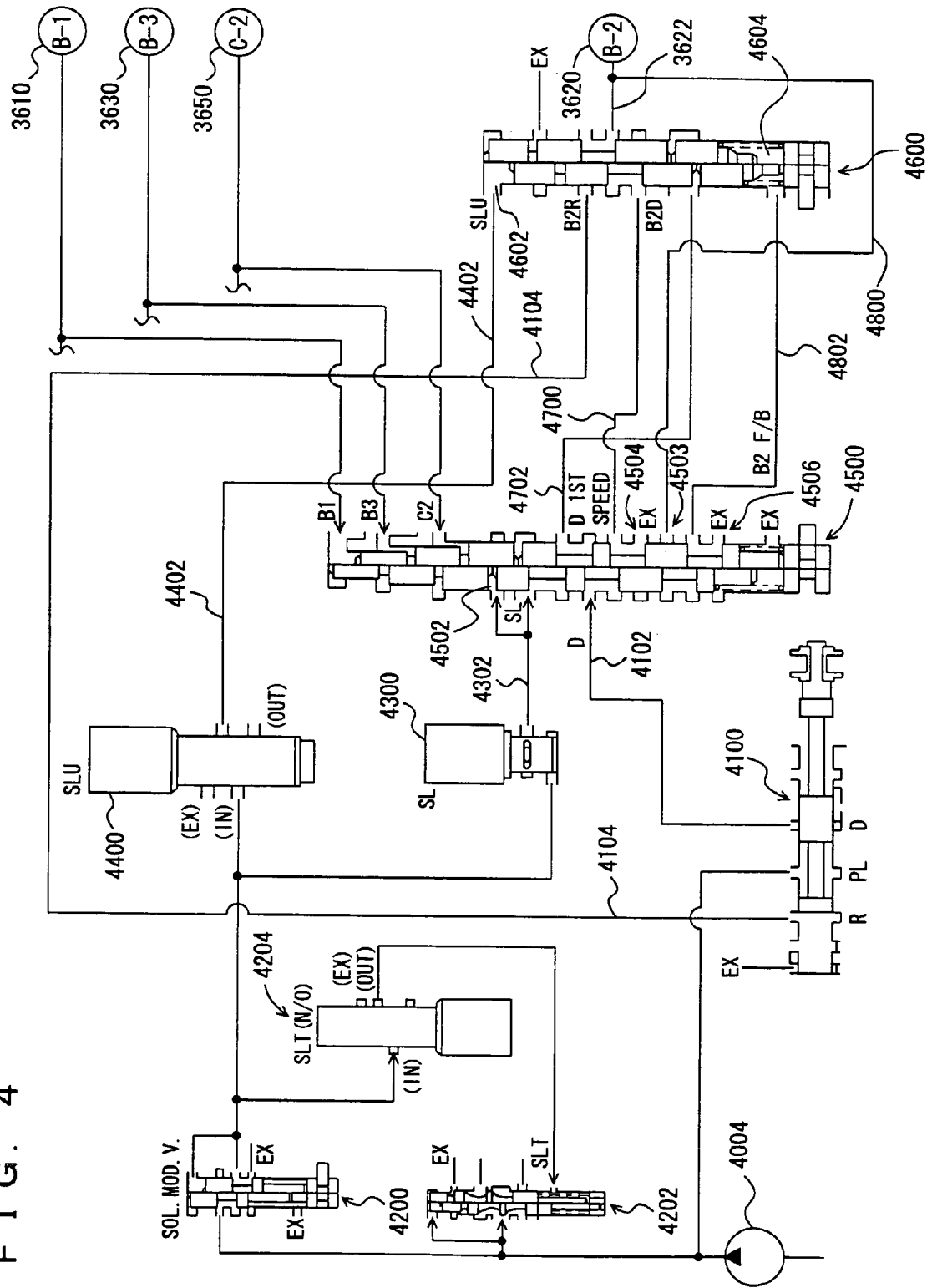
FIG. 4 shows a portion of an oil hydraulic circuit.

In the case where at least one of the SL pressure, B1 pressure, B3 pressure and C2 pressure is supplied to B2 apply control valve 4500, the spool of B2 apply control valve 4500 attains the right-side state in FIG. 4. In this state, first D-range pressure oil channel 4102 communicates with second D-range pressure oil channel 4702, and first D-range pressure oil channel 4102 is cut off from D 1st speed oil channel 4700. D 1st speed oil channel 4700 communicates with a drain port 4504 of B2 apply control valve 4500. Second feedback oil channel 4802 communicates with drain port 4506 of B2 apply control valve 4500.

When none of the SL pressure, B1 pressure, B3 pressure and C2 pressure are supplied to B2 apply control valve 4500, the spool of B2 apply control valve 4500 attains the left-side state in FIG. 4. Under this state, first D-range pressure oil channel 4102 communicates with D 1st speed oil channel 4700. First D-range pressure oil channel 4102 is cut off from second D-range pressure oil channel 4702. First feedback oil channel 4800 communicates with second feedback oil channel 4802.

The spool of B2 control valve 4600 is shifted according to the balance among the SLU pressure, the D-range pressure supplied via second D-range pressure oil channel 4702, the feedback pressure, and the urging force of the spring provided in feedback pressure chamber 4604.

When the spool of B2 control valve 4600 attains the right-side state in FIG. 4, R-range pressure oil channel 4104 communicates with B2 oil channel 3622. D 1st speed oil channel 4700 is cut off from B2 oil channel 3622.

In the case where the spool of B2 control valve 4600 attains the left-side state in FIG. 4, communication is established through D 1st speed oil channel 4700, B2 oil channel 3622, and first feedback oil channel 4800. R-range pressure oil channel 4104 is cut off from B2 oil channel 3622.

Figure 5:
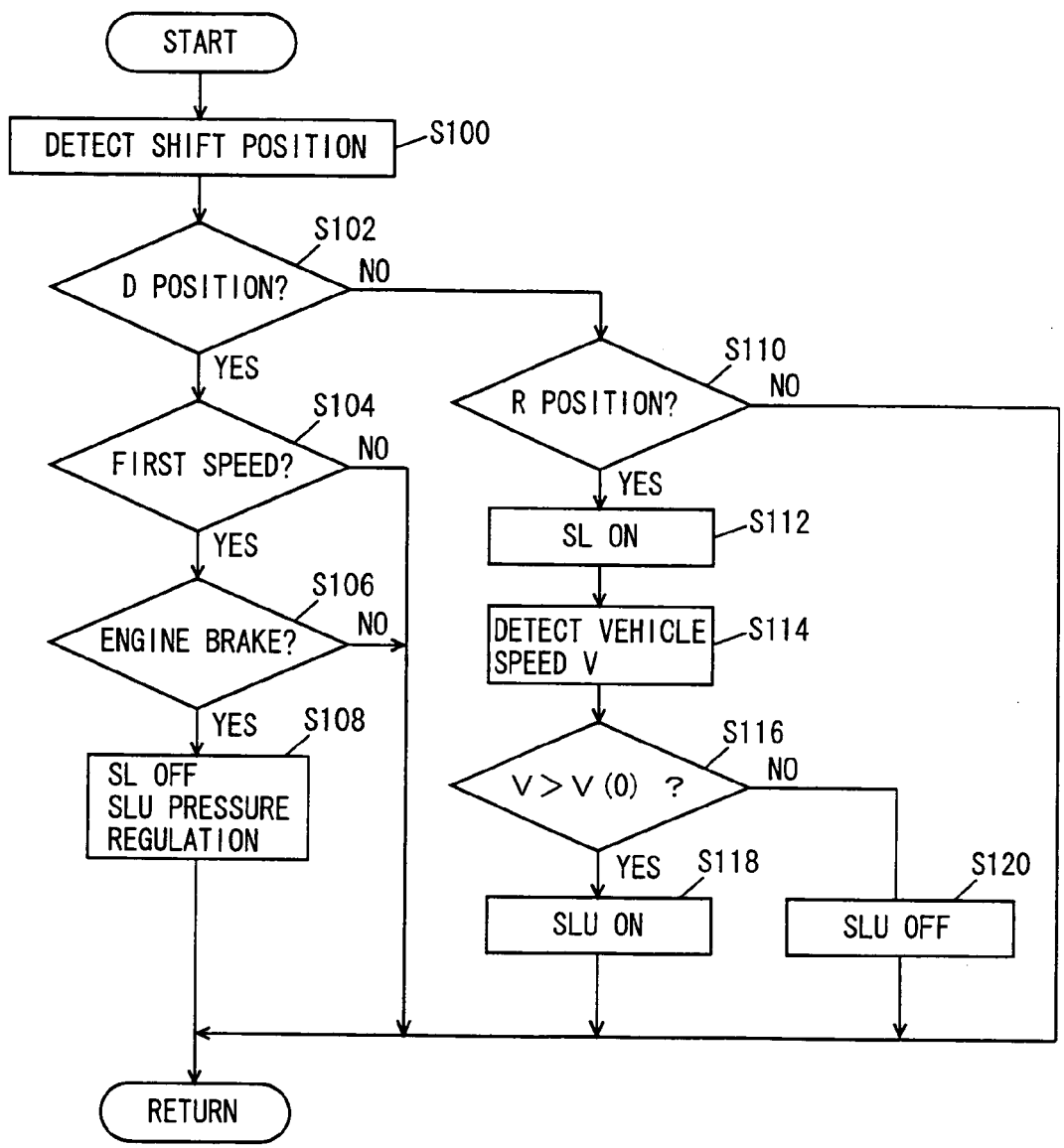
FIG. 5 is a flow chart representing a control configuration of a program executed by an ECU of a hydraulic control apparatus for an automatic transmission according to an embodiment of the present invention.
Figure 6:
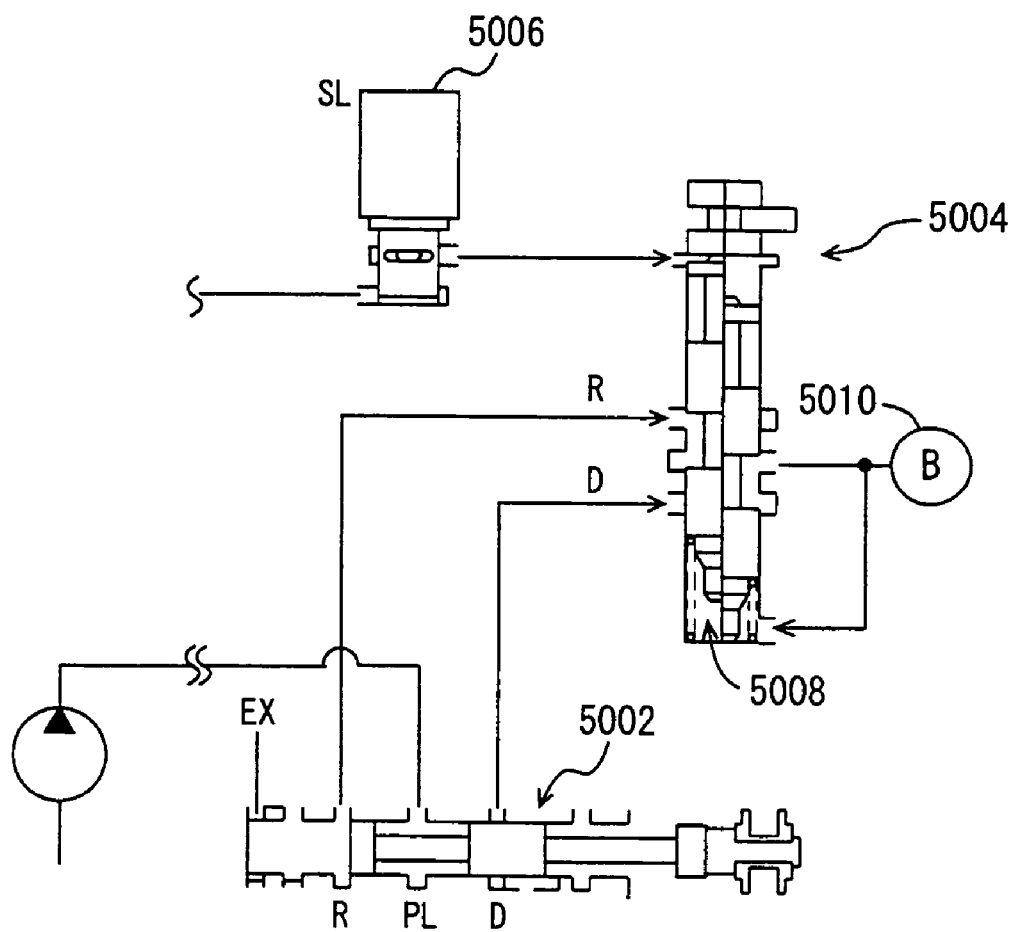
FIG. 6 represents a conventional reverse inhibit valve.

A control configuration of the program executed by ECU 8000 of the hydraulic control apparatus of the automatic transmission according to the present embodiment will be described hereinafter with reference to FIG. 5.

At step (hereinafter, step abbreviated as S) 100, ECU 8000 detects the shift position based on a signal transmitted from position sensor 8006. At S102, ECU 8000 determines whether the shift position is at a forward running (D) position or not. When the shift position is at the D position (YES at S102), control proceeds to S104, otherwise (NO at S102), control proceeds to S110.

At S104, ECU 8000 determines whether the gear is first speed or not. This determination can be made through a shifting diagram or the like. When the gear is first speed (YES at S104), control proceeds to S106, otherwise (NO at S104), the process ends.

At S106, ECU 8000 determines whether the state corresponds to an engine brake state or not. This determination is made based on, for example, the vehicle speed and accelerator pedal position. When the vehicle is not in an engine brake state (YES at S106), control proceeds to S108, otherwise (NO at S106), the process ends.

At S108, ECU 8000 turns off solenoid (SL) 4300. Linear solenoid (SLU) 4400 regulates the D-range pressure supplied from D 1st speed oil channel 4700.

At S110, ECU 8000 determines whether the shift position is at a reverse running (R) position or not. When the shift position is at the R position (YES at S110), control proceeds to S112, otherwise (NO at S110), the process ends.

At S112, ECU 8000 turns on the linear solenoid (SL). At S114, ECU 8000 detects the vehicle speed V based on a signal transmitted from vehicle speed sensor 8002.

At S116, ECU 8000 determines whether vehicle speed V is higher than a predetermined vehicle speed (V (0)>0). When vehicle speed V is higher than the predetermined vehicle speed V (0) (YES at S16), control proceeds to S118, otherwise (NO at S116), control proceeds to S120. At S118, ECU 8000 turns on the linear solenoid (SLU). At S120, ECU 8000 turns off the linear solenoid (SLU).

An operation of ECU 8000 in the hydraulic control apparatus for an automatic transmission according to the present invention will be described hereinafter based on the structure and flow chart set forth above.

When the shift position is detected (S100) and the shift position is at the D position (YES at S102), determination is made whether the gear is first speed or not (S104). When the gear is at first speed (YES at S104) and in an engine brake state (YES at S106), solenoid (SL) 4300 is turned off, and the D-range pressure supplied from D 1st speed oil channel 4700 is regulated by linear solenoid (SLU) 4400 (S108).

In such a state, none of the SL pressure, B1 pressure, B3 pressure and C2 pressure are supplied to B2 apply control valve 4500. Therefore, the spool of B2 control valve 4600 attains the left-side state in FIG. 4 by the urging force of the spring. In this case, first D-range pressure oil channel 4102 communicate with D 1st speed oil channel 4700, whereby the D-range pressure is supplied to B2 control valve 4600.

Since the SLU pressure is supplied to B2 control valve 4600, the spool of B2 control valve 4600 attains the left-side state in FIG. 4. In such a state, the D-range pressure supplied from D 1st speed oil channel 4700 is adjusted with the SLU pressure as the pilot pressure. The oil pressure adjusted at B2 control valve 4600 is supplied to the hydraulic servo of B2 brake 3620.

The oil pressure supplied to the hydraulic servo of B2 brake 3620 is returned to B2 apply control valve 4500 via first feedback oil channel 4800. Since the spool of B2 control valve 4600 attains the left-side state in FIG. 4, first feedback oil channel 4800 communicates with second feedback oil channel 4802. Therefore, the feedback pressure is supplied to feedback pressure chamber 4604 of B2 control valve 4600 via second feedback oil channel 4802. The feedback pressure supplied to feedback pressure chamber 4604 establishes the drive of the spool of B2 control valve 4600 towards the right-side state in FIG. 4. Accordingly, the oil pressure supplied to the hydraulic servo of B2 brake 3620 is reduced, whereby an abrupt engagement of B2 brake 3620 is suppressed.

When the gear is not at first speed (NO at S104), i.e. when the speed of transmission is implemented at one of second to sixth speed gears, at least one of the B 1 pressure, B3 pressure and C2 pressure is supplied to B2 apply control valve 4500.

Even in the case where the gear is at first speed (YES at S104), SL pressure is supplied to B2 apply control valve 4500 if the SL is turned on for lockup engagement as long as the engine brake is not applied (NO at S106).

In the circumstances set forth above, the spool of B2 apply control valve 4500 attains the right-side state in FIG. 4. In this state, first D-range pressure oil channel 4102 communicates with second D-range pressure oil channel 4702, whereby the D-range pressure is supplied from second D-range pressure oil channel 4702 to B2 control valve 4600. When the D-range pressure is supplied to B2 control valve 4600 from second D-range pressure oil channel 4702, the spool of B2 control valve 4600 attains the right-side state in FIG. 4 even if the SLU pressure is supplied.

In this case, B2 oil channel 3622 communicates with R-range pressure oil channel 4104, whereby the oil pressure from the hydraulic servo of B2 brake 3620 is drained away via manual valve 4100. Accordingly, B2 brake 3620 is released. Thus, implementation of first speed gear is suppressed.

When the shift position is not at the D position (NO at S102), but at the R position (YES at S110), solenoid (SL) 4300 is turned on (S112). Accordingly, the spool of B2 apply control valve 4500 attains the right-side state in FIG. 4.

In this state, first D-range pressure oil channel 4102 communicates with second D-range pressure oil channel 4702. Therefore, the oil pressure in second D-range pressure oil channel 4702 is drained away from manual valve 4100 via first D-range pressure oil channel 4102. Further, the second feedback oil channel 4802 communicates with drain port 4506 of B2 apply control valve 4500. Therefore, the oil pressure in feedback pressure chamber 4604 is drained off. In this case, the spool of B2 control valve 4600 attains the right-side state in FIG. 4 by the urging force of the spring if the SLU pressure is not supplied to B2 control valve 4600.

When the spool of B2 control valve 4600 attains the right-side state in FIG. 4, R-range pressure oil channel 4104 communicates with B2 oil channel 3622. Therefore, R-range pressure is supplied to B2 brake 3620.

When R-range pressure is supplied to B2 brake 3620, the reverse gear can be implemented since B2 brake 3620 engages. It is appreciated that implementation of the reverse gear must be suppressed if the driver has erroneously shifted the shift lever to the R position during forward running.

Vehicle speed V is detected (S114) in order to determine whether implementation of the reverse gear is to be suppressed or not. When vehicle speed V is higher than a predetermined vehicle speed V (0), determination is made that the vehicle is currently running forward (YES at S116), whereby linear solenoid (SLU) 4400 is turned on (S118).

The turn-on of linear solenoid (SLU) 4400 (S118) causes the SLU pressure to be supplied to B2 control valve 4600. At this stage, the spool of B2 control valve 4600 promptly attains the left-side state in FIG. 4 since the oil pressure in feedback pressure chamber 4604 is drained off.

When the spool of B2 control valve 4600 attains the left-side state in FIG. 4, R-range pressure oil channel 4104 is cut off from B2 oil channel 3622, whereby the R-range pressure is cut off. Further, D 1st speed oil channel 4700 communicates with B2 oil channel 3622. At this stage, D 1st speed oil channel 4700 communicates with drain port 4504 of B2 apply control valve 4500. Therefore, the oil pressure in the hydraulic servo of B2 brake 3620 is drained away though drain port 4504 of B2 apply control valve 4500 via D 1st speed oil channel 4700. Therefore, B2 brake 3620 is released to suppress implementation of the reverse gear.

In contrast, when vehicle speed V is lower than the predetermined vehicle speed V (0) and the vehicle is currently reverse-running (NO at S116), linear solenoid (SLU) 4400 is turned off (S120). In this case, the spool of B2 control valve 4600 attains the right-side state in FIG. 4. Therefore, the R-range pressure is supplied to the hydraulic servo of B2 brake 3260, whereby the reverse gear is implemented.

Thus, the B2 apply control valve in the hydraulic control apparatus of the automatic transmission of the present embodiment establishes communication between the second feedback oil channel and the drain port, and between the D 1st speed oil channel communicates and the drain port, upon supply of the SL pressure. The B2 control valve cuts off the R-range pressure oil channel from the B2 oil channel, and establishes communication between the B2 oil channel and the D 1st speed oil channel, upon supply of the SLU pressure. The ECU turns on the linear solenoid (SL) when the shift position is at the R position. Accordingly, the feedback pressure in the feedback pressure chamber of the B2 control valve is drained away though the drain port of the B2 apply control valve. The ECU turns on the linear solenoid (SLU) when the vehicle is currently driving forward. At this stage, the spool of the B2 control valve promptly moves since the feedback pressure in the feedback pressure chamber is drained out. Accordingly, the R-range pressure is cut off to allow the oil pressure to be drained away from the hydraulic servo of the B2 brake. Therefore, the B2 brake can be released. As a result, implementation of a reverse gear during forward running can be suppressed.

Although the present invention has been described and illustrated in detail, it is clearly understood that the same is by way of illustration and example only and is not to be taken by way of limitation, the scope of the present invention being limited only by the terms of the appended claims.

What is claimed is:

1. A hydraulic control apparatus for an automatic transmission having a gear implemented by engagement of a friction engagement element, comprising:

a pressure regulation valve including a first control pressure chamber to which first control pressure is introduced from a first control valve, and a feedback pressure chamber to which oil pressure that is to be supplied to said friction engagement element is branched off and introduced as feedback pressure, said pressure regulation valve being switched between an oil pressure supply state in which oil pressure generated at an oil pressure source is regulated to be supplied to said friction engagement element and an oil pressure cutoff state in which oil pressure is cut off, based on balance between said first control pressure and said feedback pressure, a switching valve including a second control pressure chamber to which second control pressure is introduced from a second control valve and a feedback pressure introduction port through which said feedback pressure is introduced, said switching valve being switched by said second control pressure to one of a feedback pressure supply state in which the oil pressure introduced from said feedback pressure introduction port is supplied to said feedback pressure chamber and a feedback pressure drain state in which oil pressure is drained away from said feedback pressure chamber, and a control unit for controlling said first control valve and said second control valve such that said pressure regulation valve attains said oil pressure cutoff state and said switching valve attains said feedback pressure drain state when a predetermined condition is met.

2. The hydraulic control apparatus for an automatic transmission according to claim 1, wherein said automatic transmission is loaded into a vehicle, said pressure regulation valve is supplied with oil pressure generated at said oil pressure source in response to selection of one of a forward position and a reverse position through manual operation by a driver, and said predetermined condition includes a condition that said reverse position is selected when a forward running speed of the vehicle is at least a predetermined speed.

3. A hydraulic control apparatus for an automatic transmission having a gear implemented by engagement of a friction engagement element, comprising:

a pressure regulation valve including a first control pressure chamber to which first control pressure is introduced from a first control valve, and a feedback pressure chamber to which oil pressure that is to be supplied to said friction engagement element is branched off and introduced as feedback pressure, said pressure regulation valve being switched between an oil pressure supply state in which oil pressure generated at an oil pressure source is regulated to be supplied to said friction engagement element and an oil pressure cutoff state in which oil pressure is cut off, based on balance between said first control pressure and said feedback pressure, a switching valve including a second control pressure chamber to which second control pressure is introduced from a second control valve and a feedback pressure introduction port through which said feedback pressure is introduced, said switching valve being switched by said second control pressure to one of a feedback pressure supply state in which the oil pressure introduced from said feedback pressure introduction port is supplied to said feedback pressure chamber and a feedback pressure drain state in which oil pressure is drained away from said feedback pressure chamber, and control means for controlling said first control valve and said second control valve such that said pressure regulation valve attains said oil pressure cutoff state and said switching valve attains said feedback pressure drain state when a predetermined condition is met.

4. The hydraulic control apparatus for an automatic transmission according to claim 3, wherein said automatic transmission is loaded into a vehicle, said pressure regulation valve is supplied with oil pressure generated at said oil pressure source in response to selection of one of a forward position and a reverse position through manual operation by a driver, and said predetermined condition includes a condition that said reverse position is selected when a forward running speed of the vehicle is at least a predetermined speed.

* * * * *